(12) United States Patent
Lee

(10) Patent No.: US 6,988,736 B2
(45) Date of Patent: Jan. 24, 2006

(54) MULTI-FUNCTIONAL INFANT-CARRYING DEVICE

(75) Inventor: Ho-Young Lee, Seoul (KR)

(73) Assignee: Seoul National University Industry Foundation, Seoul (KR)

( * ) Notice: Subject to any disclaimer, the term of this patent is extended or adjusted under 35 U.S.C. 154(b) by 115 days.

(21) Appl. No.: 10/742,486

(22) Filed: Dec. 18, 2003

(65) Prior Publication Data

US 2004/0145133 A1 Jul. 29, 2004

(30) Foreign Application Priority Data

Jan. 29, 2003 (KR) ...................... 10-2003-0005708

(51) Int. Cl.
*A47D 13/10* (2006.01)

(52) U.S. Cl. ................ 280/47.25; 280/652; 280/655.1; 280/30; 280/648

(58) Field of Classification Search ............ 280/47.25, 280/652, 655.1, 30, 648; D34/24; D12/129; 297/256.16, 250.1, 256.17, 274, 273; 284/129
See application file for complete search history.

(56) References Cited

U.S. PATENT DOCUMENTS

| | | | | |
|---|---|---|---|---|
| 3,010,731 | A | * 11/1961 | Kenney | .......................... 280/9 |
| 5,470,039 | A | * 11/1995 | Hilger | .......................... 248/164 |
| 6,155,579 | A | * 12/2000 | Eyman et al. | ................ 280/30 |
| 6,880,850 | B2 | * 4/2005 | Hsia | ............................ 280/642 |

\* cited by examiner

*Primary Examiner*—Bryan Fischmann
*Assistant Examiner*—Cynthia F. Collado
(74) *Attorney, Agent, or Firm*—Michael A. Glenn; Glenn Patent Group

(57) ABSTRACT

Provided is a multi-functional infant-carrying device which functions as both an infant carrier and a carriage. The device includes a pair of front frame members which are arranged to slant forward and include a sling; a back seat for seating an infant; and support portions which extend backward from the front frame members to support the back seat so as to enable the control of the angle of the back seat. A handle is mounted at top ends of the front frame members, and wheels are mounted at bottom ends of the front frame members to contact the ground.

7 Claims, 9 Drawing Sheets

[Fig. 1]
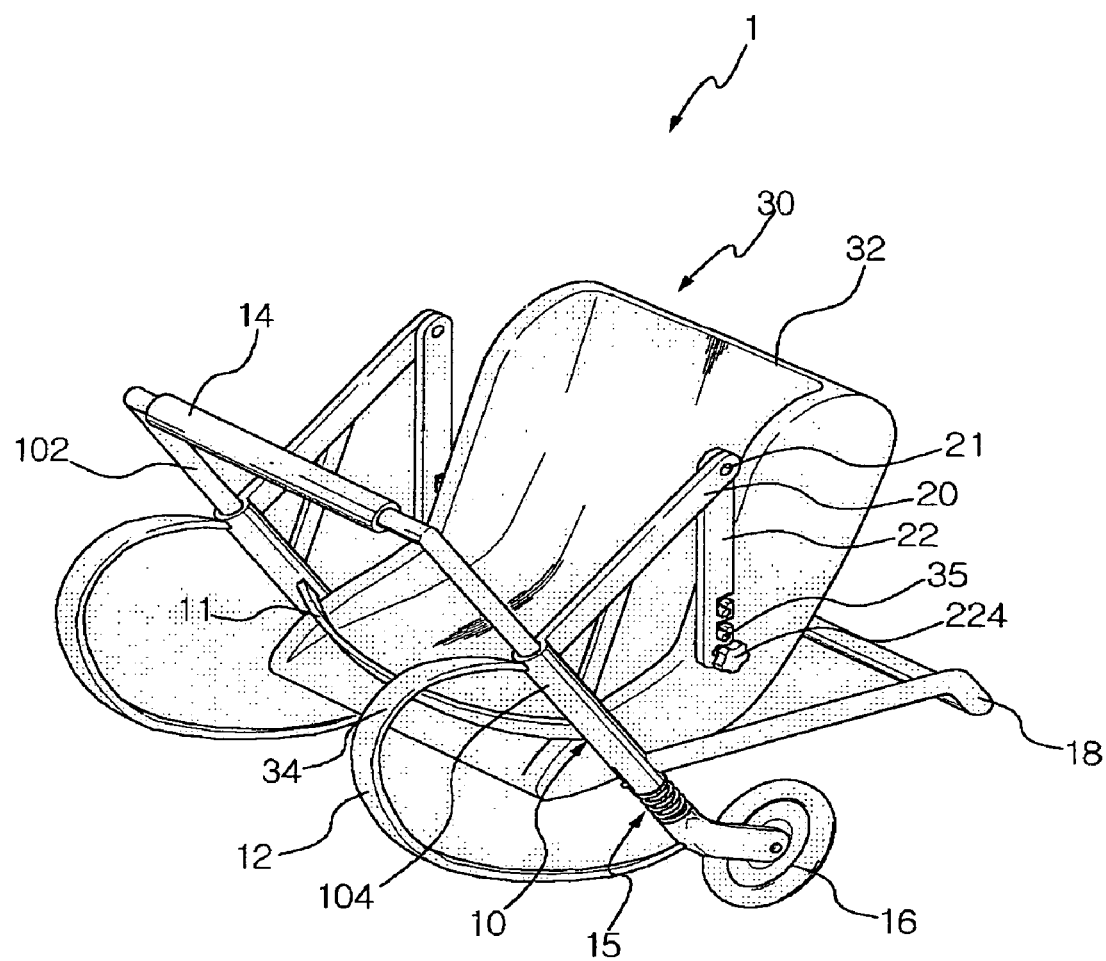

[Fig. 2]
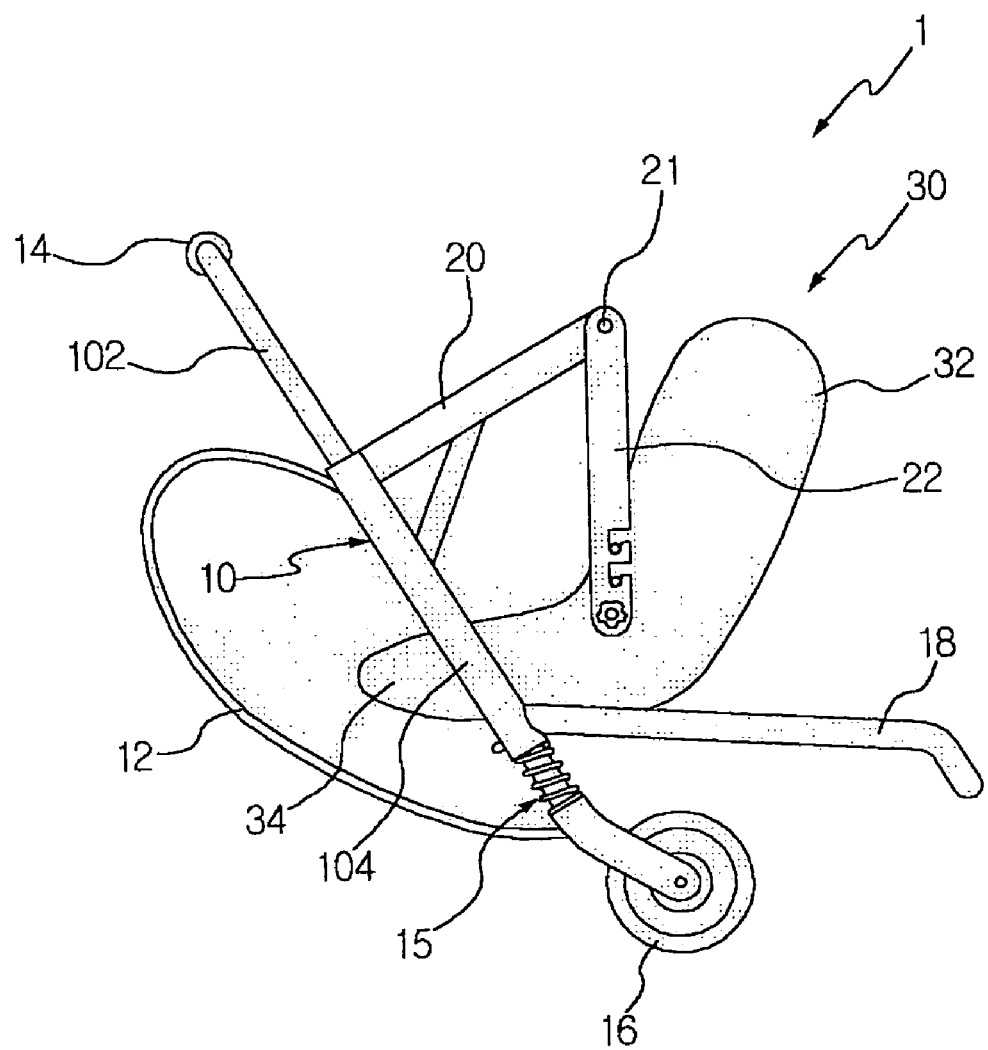

[Fig. 3]
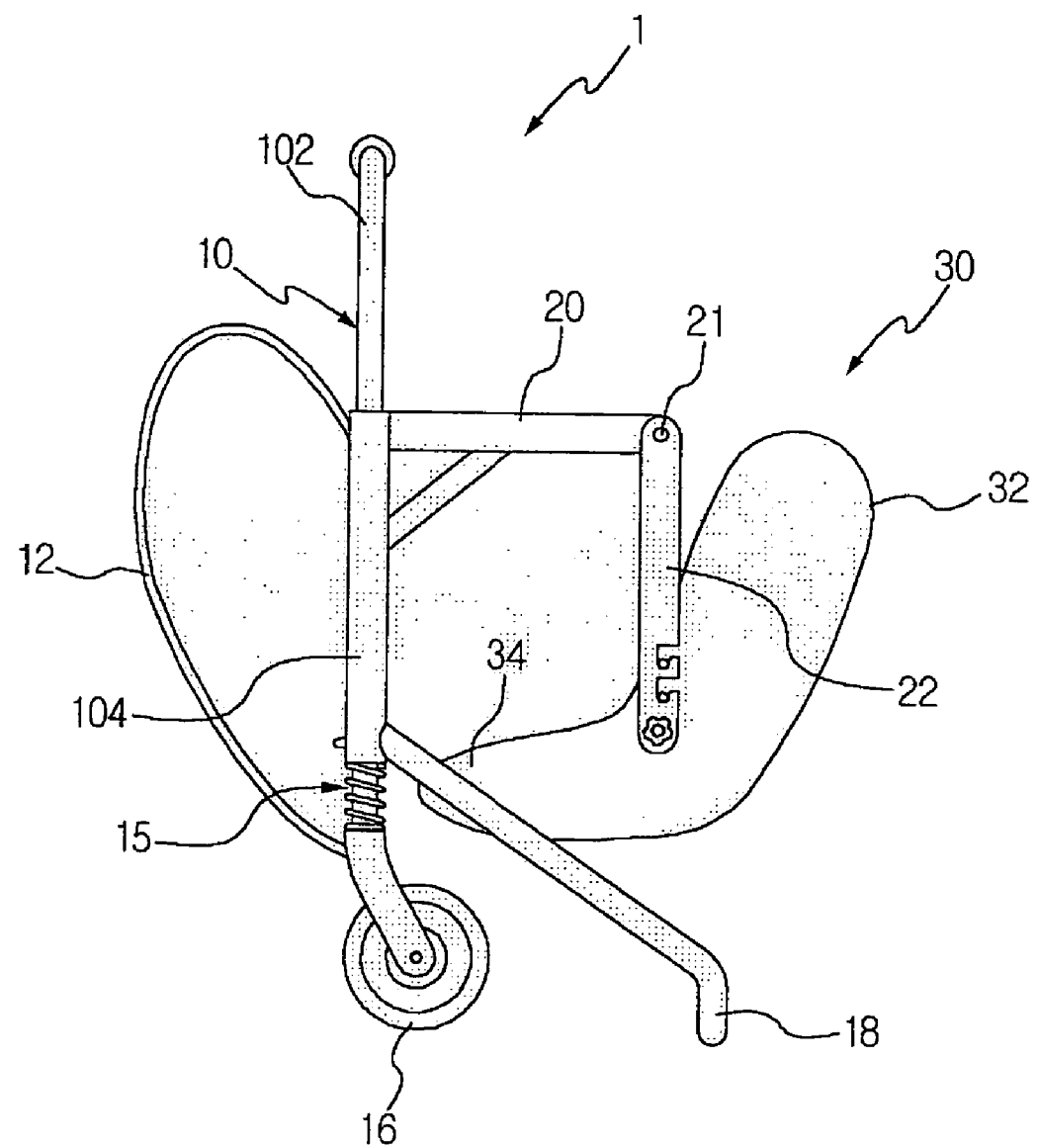

[Fig. 4]
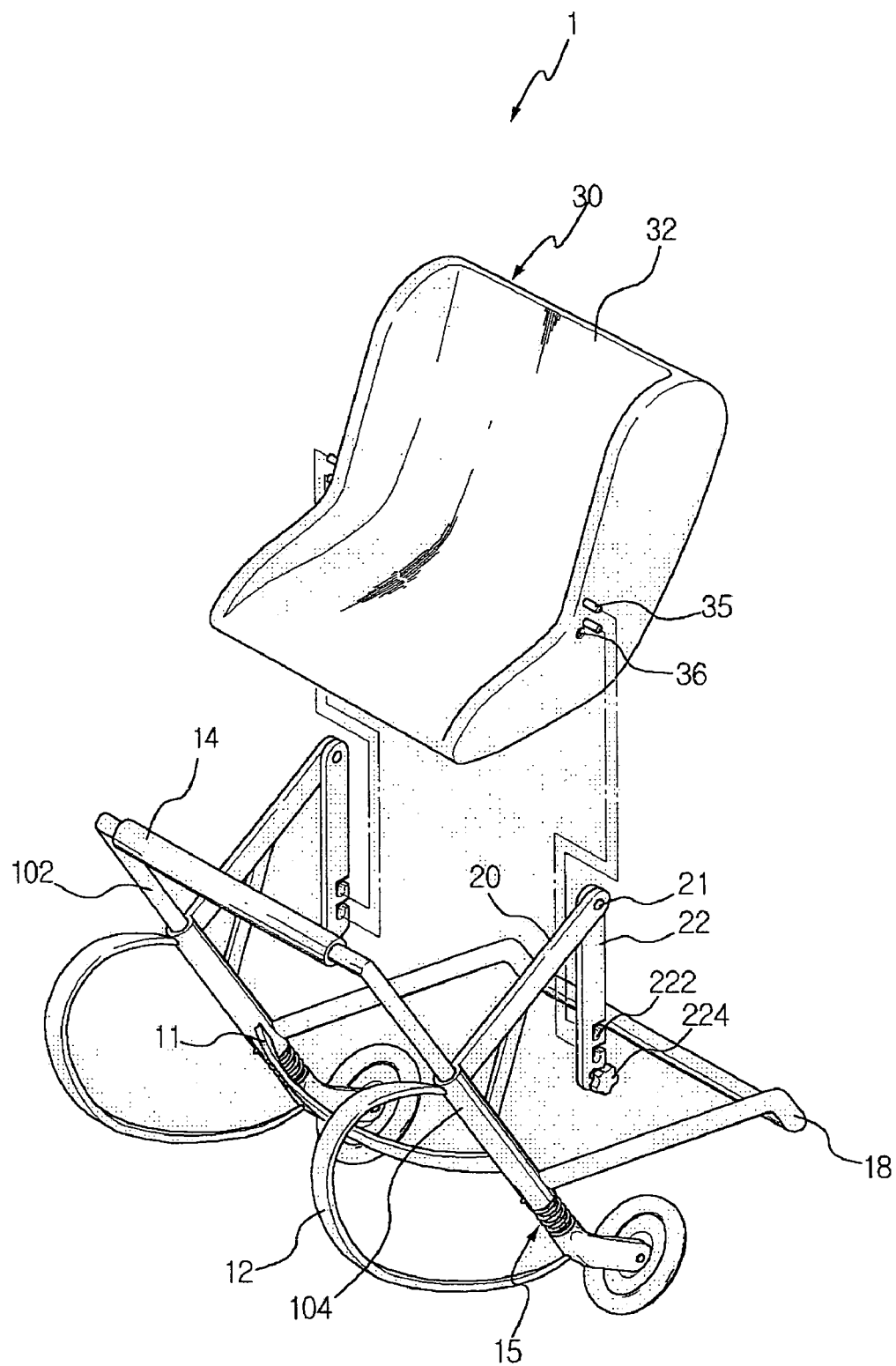

[Fig. 5]
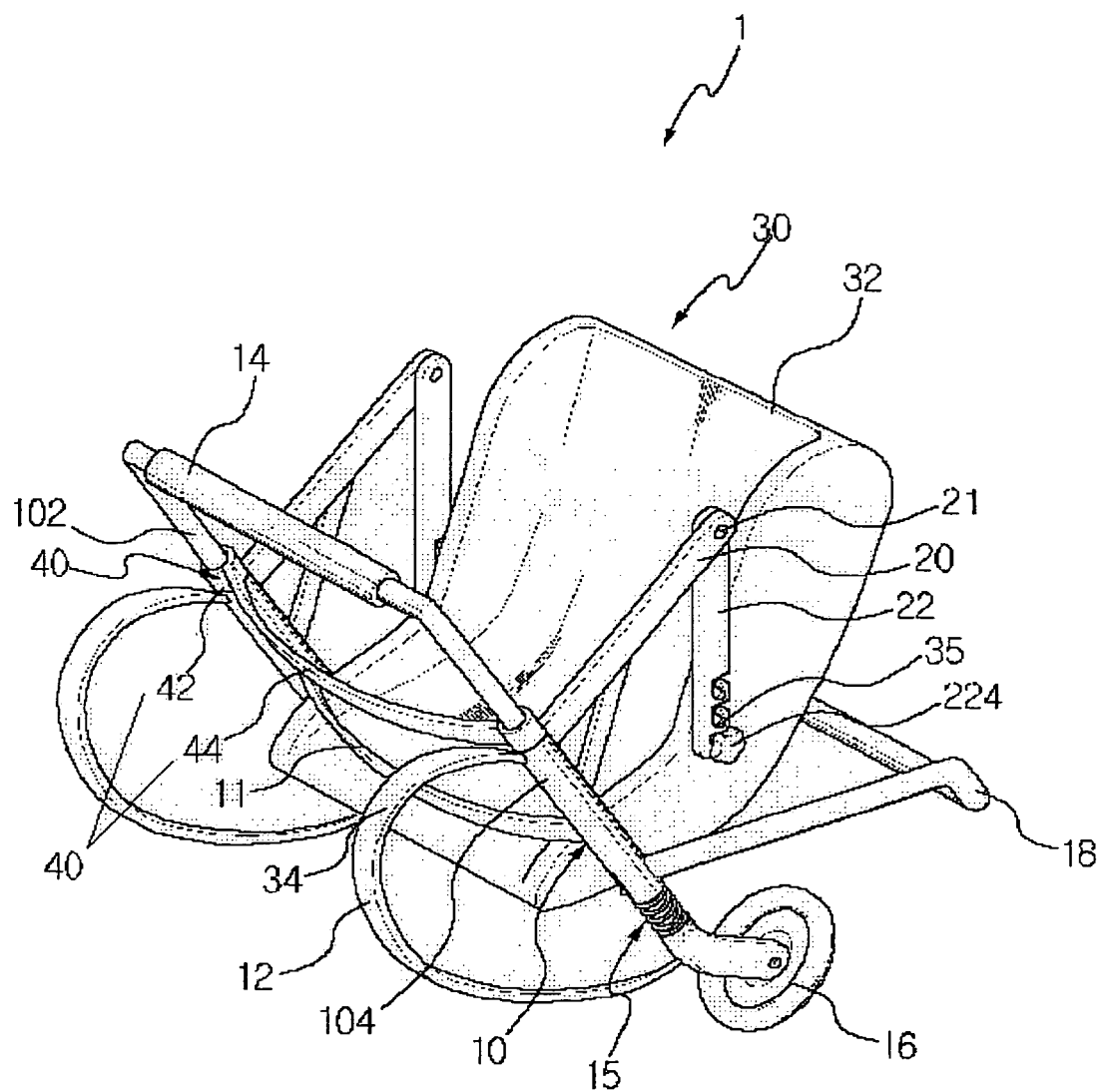

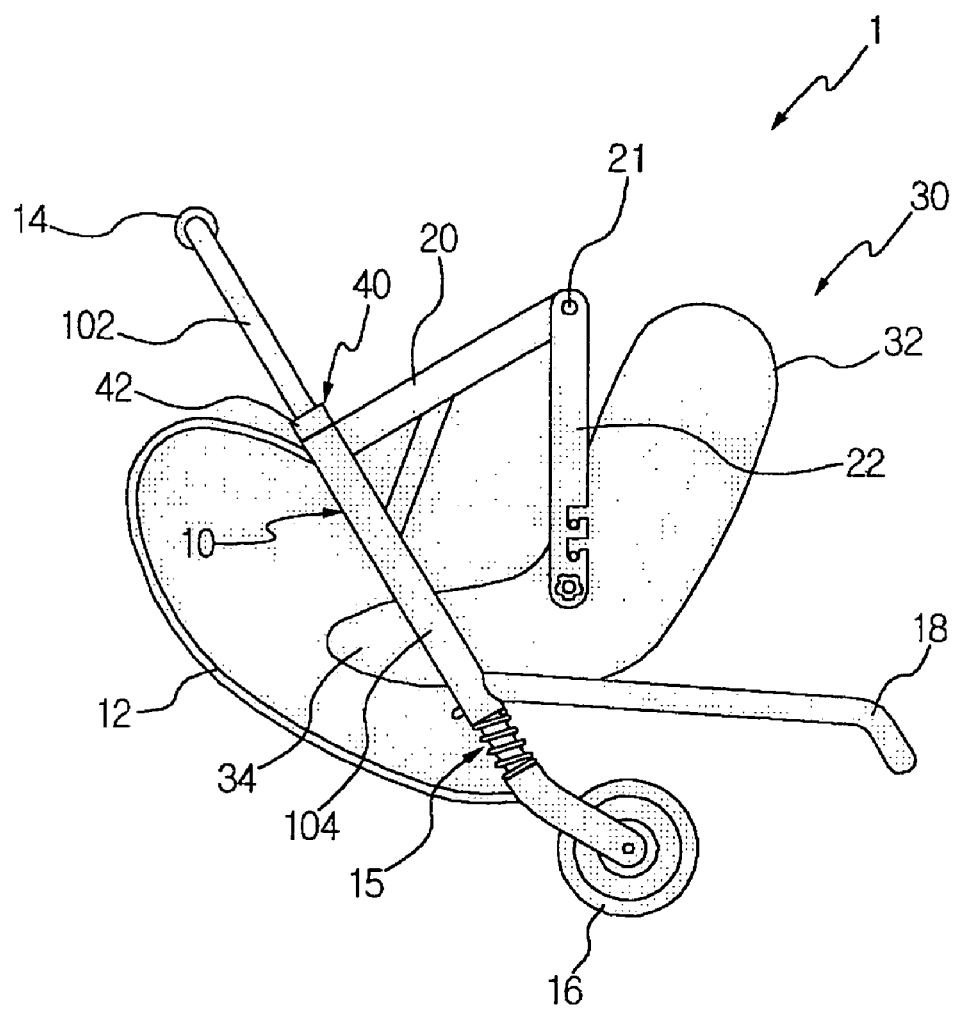
[Fig. 6]

[Fig. 7]
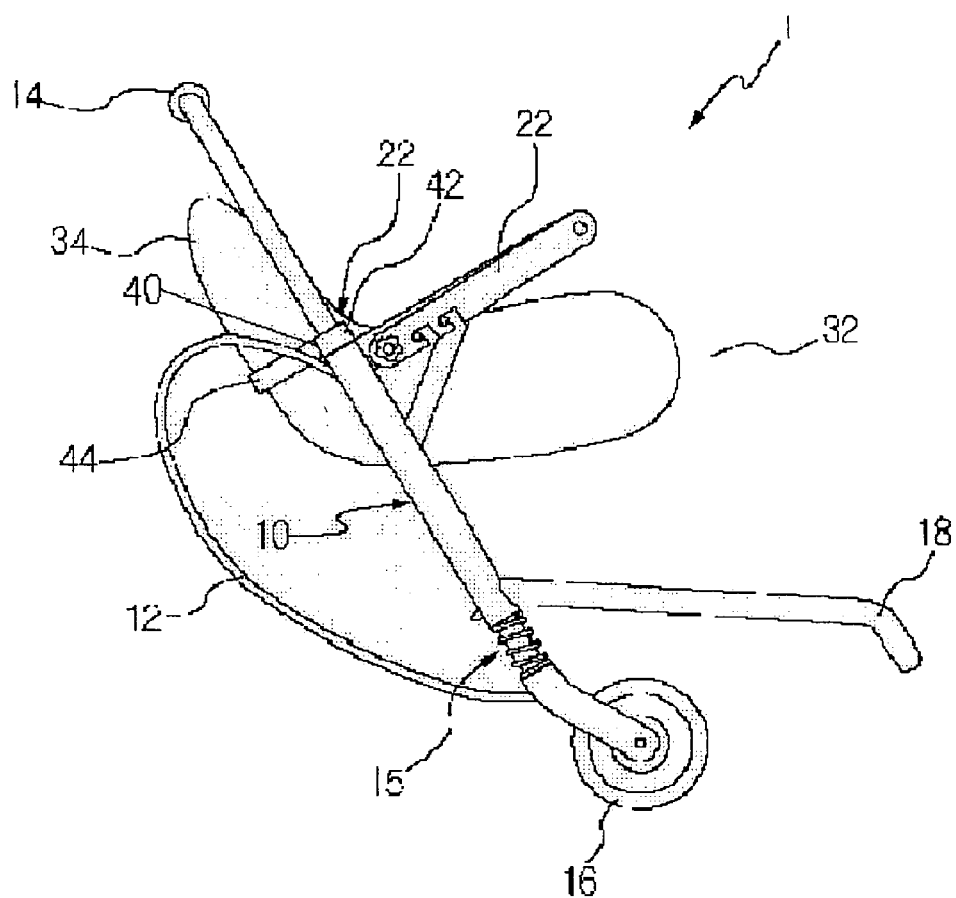

[Fig. 8]
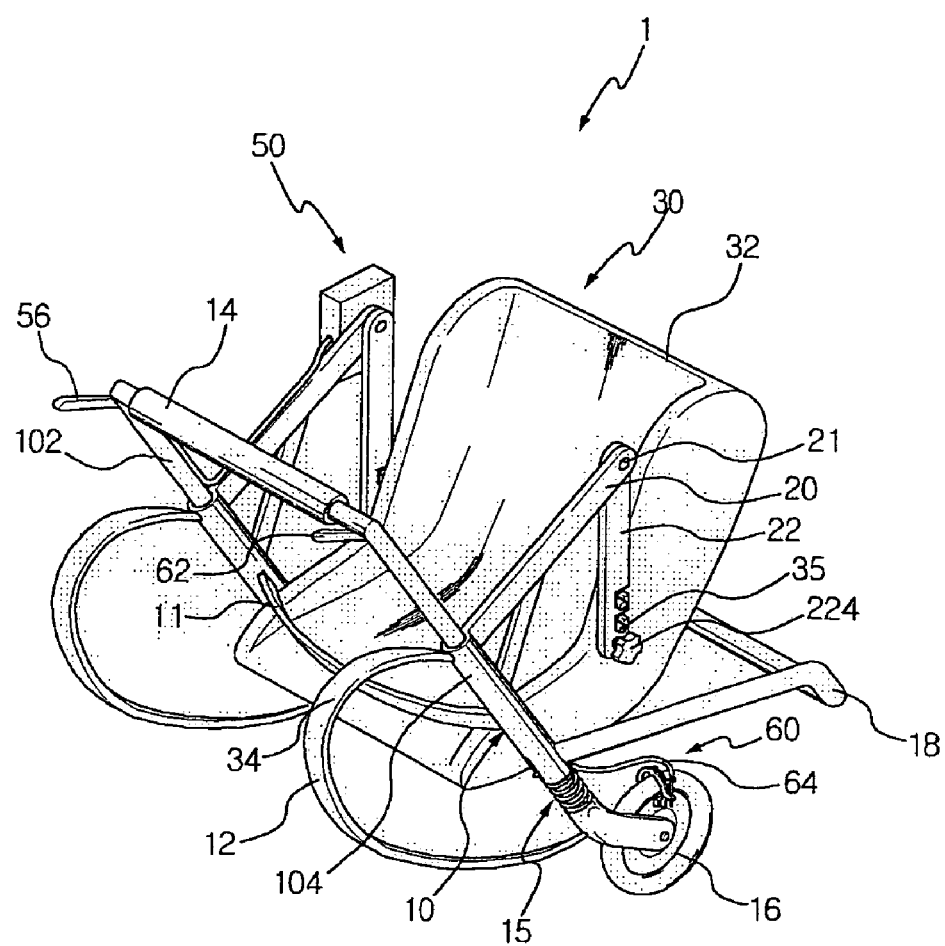

[Fig. 9]
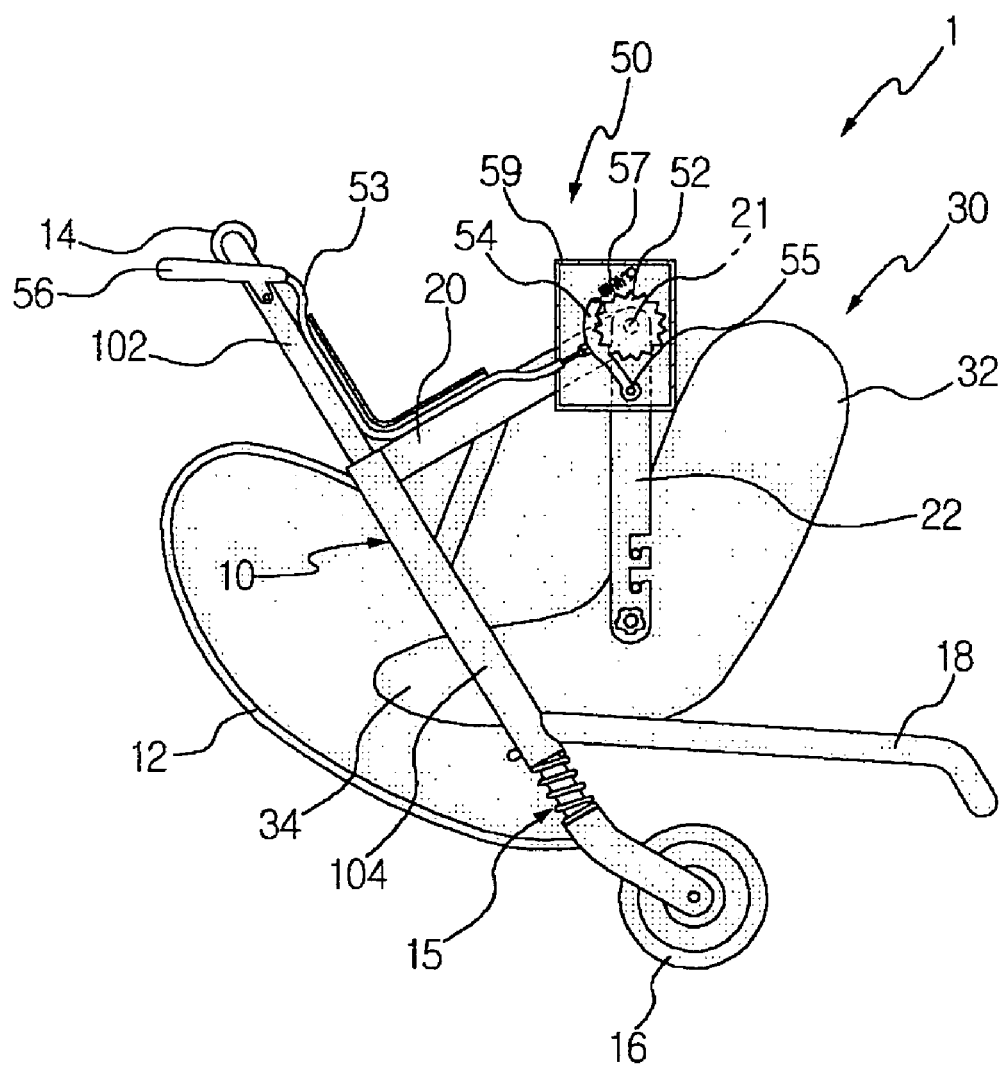

MULTI-FUNCTIONAL INFANT-CARRYING DEVICE

This application claims the priority of Korean Patent Application No. 2003-5708, filed on Jan. 29, 2003, in the Korean Intellectual Property Office, the disclosure of which is incorporated herein by reference in their entirety.

BACKGROUND OF THE INVENTION

1. Field of the Invention

The present invention relates to an infant-carrying device which functions as an infant carrier, a carriage, and even a car seat, and more particularly, to a multi-functional infant-carrying device which is structured to facilitate conversion from an infant carrier into a carriage and vice versa.

2. Description of the Related Art

A carriage comprises a seat taken by an infant and wheels which roll on the ground. A user pulls and pushes the carriage to set it in motion.

An infant carrier comprises a seat (or an infant pouch) taken by an infant and a sling and allows a user to conveniently carry the infant on the back or hold the infant in his or her arms.

The carriage and the infant carrier have been widely used for ages to carry infants in comfortable manners.

However, a carriage is under mobile restrictions. That is, it is very difficult to go up and down stairs and steep roads using the carriage.

Although an infant carrier is not greatly affected by places, since a user lifts up and carries an infant, the infant carrier requires more energy than the carriage.

Therefore, a infant-carrying device, which serves as both an infant carrier and a carriage and allows a user to easily carry an infant irrespective of places, is required.

In a conventional infant-carrying device, a handle for carriage use is positionally opposite to a sling for carrier use. Thus, whenever a carriage mode is converted into a carrier mode and vice versa, a user should operate the handle in an opposite direction and then fix the handle.

Also, the conventional infant-carrying device is structured such that a user only pushes the infant-carrying device to move it in the carriage mode. This structure makes it inconvenient for a user to control the direction of the carriage or to go over a hilly road.

Further, since a carriage is conventionally structured to use four wheels all the time, it is difficult for a user to move the carriage on an escalator installed in a department store, a shopping mall, or a subway station.

Also, an infant pouch or an infant seat is always fixed to the conventional infant-carrying device. Thus, it is impossible to provide an infant with optimum comfort according to circumstances.

SUMMARY OF THE INVENTION

The present invention provides an infant-carrying device which serves as both a carriage and an infant carrier. The infant-carrying device comprises a pair of front frame members which are arranged to slant forward and include a sling; a back seat for seating an infant; and support portions which extend backward from the pair of front frame members, respectively, to support the back seat so as to enable the control of the angle of the back seat. A handle is mounted at top ends of the pair of front frame members, and wheels are mounted at bottom ends of the pair of front frame members so as to contact the ground.

Herein, the support portions may comprise a pair of rear frame members and a pair of seat supports which are rotarably combined to front ends of the rear frame members, respectively, and are attached to the back seat.

BRIEF DESCRIPTION OF THE DRAWINGS

The above object and advantages of the present invention will become more apparent by describing in detail exemplary embodiments thereof with reference to the attached drawings in which:

FIG. 1 is a perspective view of a multi-functional infant-carrying device according to an embodiment of the present invention, in which the infant-carrying device is in a carriage mode;

FIG. 2 is a lateral view of the infant-carrying device shown in FIG. 1, in which the infant-carrying device is in the carriage mode;

FIG. 3 is a lateral view of the infant-carrying device shown in FIG. 1, in which the infant-carrying device is in a carrier mode;

FIG. 4 is a perspective view of a back seat of the infant-carrying device shown in FIGS. 1 through 3, in which the back seat is separated from the infant-carrying device to serve as a car seat;

FIG. 5 is a perspective view of an infant-carrying device according to another embodiment of the present invention;

FIG. 6 is a lateral view of the infant-carrying device shown in FIG. 5;

FIG. 7 is a lateral view of the infant-carrying device shown in FIGS. 5 and 6, in which a back support portion and a buttock support portion of a back seat are functionally converted into each other by a user;

FIG. 8 is a perspective view of an infant-carrying device according to a yet another embodiment of the present invention; and FIG. 9 is a left lateral view of the infant-carrying device shown in FIG. 8, showing a partial section of a locking portion for selectively locking a back seat.

DETAILED DESCRIPTION OF THE INVENTION

The present invention will now be described more fully with reference to the accompanying drawings, in which exemplary embodiments of the invention are shown.

As shown in FIGS. 1 through 3, an infant-carrying device 1 according to an embodiment of the present invention comprises a pair of front frame members 10, a pair of rear frame members 20 which extend backward from the front frame members 10, respectively, a back seat 30 for seating an infant, and a pair of seat supports 22. Each of the seat supports 22 has a front end connected to the back seat 30 and a rear end that is rotarably connected to a corresponding rear frame member 20 so as to rotate the back seat 30.

The pair of front frame members 10 each are rod-shaped and arranged parallel to each other. A sling 12, which is used in a carrier mode, is installed in front of the front frame members 10 to allow a user to carry an infant in the back seat 30 on the back. The length of the sling 12 may be appropriately controlled. Also, in the present embodiment, the front frame members 10 comprise a back string 11 to allow a user to carry an infant on the back more conveniently in the carrier mode, which would be apparent to those skilled in the art.

A handle 14 is mounted at top ends of the front frame members 10, and wheels 16 are mounted at bottom ends thereof. The handle 14 and the wheels 16 are used in a carriage mode, and the wheels 16 (e.g., caster wheels) may be structured to facilitate the control of directions.

A pair of rear frame members 20 are installed directly below the handle 14 so as to rotarably support the back seat 30 and the seat supports 22 that are attached to the back seat 30. Preferably, a pair of rod-shaped rear frame members 20 extend backward from the front frame members 10, and more preferably, perpendicularly to the front frame members 10.

In the infant-carrying device 1 of the present embodiment, the handle 14 and the wheels 16 also are installed at the front frame members 10 where the sling 12 is installed. Thus, a user can easily convert the carrier mode into the carriage mode and vice versa without greatly changing the positions of the handle 14 and the wheels 16.

The height of the handle 14 can be controlled according to the height of a user. In the present embodiment, to enable the height control of the handle 14, the front frame members 10 may comprise movement portions 102 which extend downward from both ends of the handle 14 perpendicularly to the handle 14, guide portions 104 for allowing the movement portions 102 to move upward and downward, and portions (not shown) for fixing the movement portions 102.

Since the portions for fixing the movement portions 102 to the guide portions 104 are apparent to those skilled in the art, a detailed description and drawings thereof will be omitted here.

Meanwhile, the front frame members 10 are arranged to slant forward such that the handle 14 mounted at the top ends of the front frame members 10 is positioned in front of the wheels 16 at the bottom ends thereof. This structure enables a user to pull and push the carriage-mode infant-carrying device 1 more conveniently. The front frame members 10 are arranged to slant particularly when a user drives, parks, and stops the infant-carrying device 1 in the carriage mode.

In the present embodiment, the rear frame members 20 extend backward from the front frame members 10, and more preferably, perpendicularly to the front frame members 10. Rotating axes 21 are installed at front ends of the front frame members 20 to rotate the seat supports 22 and the back seat 30 attached to the seat supports 22.

The seat supports 22, preferably, rod-shaped seat supports 22, each are rotarably installed at the rotating axes 21 of the rear frame members 20. The back seat 30 for seating an infant is mounted on the seat supports 33.

The back seat 30 is comprised of a buttock support portion 34 for supporting an infant's buttocks and a back support portion 32 for supporting the infant's back, in the shape of "L". Front ends of the seat supports 22 are attached to both sides of the back seat 30 midway between the back support portion 32 and the buttock support portion 34 such that the buttock support portion 34 is positioned parallel to the ground (refer to FIG. 2).

As shown in FIG. 3, the seat supports 22, which are connected to the back seat 30, rotate on the rotating axes 21 of the rear frame members 20 so as to vary the angle of inclination of the back seat 30. Thus, an infant can be seated more comfortably in the carriage mode and carrier mode.

In other words, in the carrier-mode infant-carrying device 1, an infant is seated more comfortably by the rotation of the seat supports 22 that are combined to the back seat 30, under the same conditions as in the carriage mode.

Meanwhile, since a point of the back seat 30 to which an infant's weight is applied is positioned on almost the same line as the rotating axes 21 of the seat supports 22, the moment caused by the infant's weight hardly occurs in the back seat 30. Consequently, the infant-carrying device 1 can safely carry an infant without additional safety means.

However, to secure infants' safety, the seat supports 22 are structured to rotate non-smoothly on the rotating axes 21 installed at the rear frame members 20.

Also, the infant-carrying device 1 of the present embodiment may further comprise a stopper 18 for parking or stopping the infant-carrying device 1 when operating the carriage-mode infant-carrying device 1 using the two wheels 16.

As shown in FIGS. 1 and 2, the stopper 18 extends backward from the bottom portions of the front frame members 10 such that a pointed end of the stopper 18 faces the ground. Accordingly, a user can easily stop or park the carriage-mode infant-carrying device 1 only by letting go off the handle 14. This is possible because the center of gravity of the infant-carrying device 1 exists in a rear portion of the infant-carrying device 1 where the back seat 30 is positioned.

As shown in FIGS. 2 and 3, although the stopper 18 contacts the ground when parking or stopping the carriage-mode infant-carrying device 1, the stopper 18 is positioned directly below the back seat 30 in the carrier mode so as not to do harm to others around the device 1.

FIG. 4 is a perspective view of the back seat 30 that is separated from the infant-carrying device 1 to serve as a car seat.

As shown in FIG. 4, the infant-carrying device 1 may be structured such that the back seat 30 is attachable to and detachable from the seat supports 22. Thus, the back seat 30 may be separated from the infant-carrying device 1 and function as a car seat.

That is, a pair of mesh protruding portions 35 and a screw hole 36 are installed on each side of the back seat 30. Also, a pair of L-shaped mesh grooves 222 for fixing the mesh protruding portions 35 and a control screw 224 corresponding to the screw hole 36 are installed on each seat support 22.

Thus, the back seat 30 can be tightly attached to the seat supports 22 or easily separated from the seat supports 22 by locking or dismantling the control screw 24 and also by intermeshing or dismantling the mesh grooves 222 and the mesh protruding portions 35.

Further, the infant-carrying device 1 may further comprise a shock absorber 15 for absorbing a shock transmitted from the wheels 16.

As shown in FIGS. 1 through 4, the shock absorber 15 comprises compressed springs, which are respectively installed at lower portions of the front frame members 10. Since the structure of the compressed springs is apparent to those skilled in the art, a detailed description will be omitted here.

Hereinafter, an infant-carrying device 1 according to another embodiment of the present invention will be described with reference to FIGS. 5 through 7. In this embodiment, the same description as in the first embodiment will not be repeated, and the same reference numerals are used to denote the same elements as in the first embodiment.

FIG. 5 is a perspective view of an infant-carrying device according to a second embodiment of the present invention. FIG. 6 is a lateral view of the infant-carrying device shown in FIG. 5. FIG. 7 is a lateral view of the infant-carrying device shown in FIGS. 5 and 6, in which a back seat 30 shown in FIG. 6 is rotated by about 90° clockwise.

As shown in FIGS. 5 through 7, the infant-carrying device 1 comprises a fixing portion 40 for fixing the back seat 30 to allow the back seat 30 of FIG. 6 to be rotated by about 90° clockwise as shown in FIG. 7. Thus, a back support portion 32 and a buttock support portion 34 are functionally converted into each other.

When the back seat 30 is positioned as shown in FIGS. 5 and 6, an infant sitting on the back seat 30 can look at a user who pulls or pushes the infant-carrying device 1. In this case, the infant-carrying device 1 may not require any additional fixing portion for fixing the back seat 30, as described in the first embodiment.

When the back seat 30 is positioned as shown in FIG. 7, in which the back support portion 32 is converted into the buttock support portion 34, an infant sitting on the back seat 30 faces the same direction as a user. Thus, the infant can see forward like in a typical carriage.

Here, the back seat 30 positioned as shown in FIG. 7 has a tendency to return to the position shown in FIGS. 5 and 6 by the moment. For this reason, the infant-carrying device 1 of the present embodiment further comprises the fixing portion 40 for fixing the back seat 30 at any position, preferably, at the position shown in FIG. 7.

As shown in FIG. 5, the fixing portion 40 comprises a pair of guide portions 42, which are inserted into the front frame members 20, respectively, and move upward and downward, and a seat support portion 44 for supporting the reverse side of the back seat 30 in the position shown in FIG. 7.

In FIG. 7, the counterclockwise rotation of the back seat 30 is limited due to the guide portions 42 of the fixing portion 40, which are caught by latches (not shown) mounted at the front frame members 10. Preferably, the seat support portion 44 of the fixing portion 40 is formed of a flexible material so as not to press an infant's back in the carrier mode.

FIGS. 8 and 9 illustrate an infant-carrying device according to a yet another embodiment of the present invention.

In the first and second embodiments, the seat supports 22 are structured such that they rotate smoothly or non-smoothly on the rotating axes 21 installed at the rear frame members 20, without any locking portion for securely locking the seat supports 22 according to the changed angle of inclination.

An infant-carrying device 1 of the present embodiment further comprises a locking portion 50 for selectively fixing the seat supports 22 to the rear frame members 20.

By selectively locking the seat supports 22 using the locking portion 50, the angle of the back seat 30 can be finely controlled to place an infant in the most comfortable position. Also, the back seat 30 can be tightly fixed to allow a user to carry the infant more safely.

As shown in FIGS. 8 and 9 that is a left lateral view of FIG. 8, the locking portion 50 comprises a circular sawtooth 52, which is integrally formed and has a concentric axis with the rotating axis 21 of one seat support 22, and a crescent sawtooth 54, which is in mesh with the circular sawtooth 52. The crescent sawtooth 54 may be selectively in mesh with the circular sawtooth 52 by a locking lever 56 installed adjacent to the handle 14.

That is, a front end of the crescent sawtooth 54 is supported by a pivot 55 and a rear end thereof is supported by a coil spring 57. Since portions for fixing the pivot 55 and the coil spring 57 are integrally formed with the rear frame members 20, the crescent sawtooth 54 can selectively move between a position in which the crescent sawtooth 54 is in mesh with the circular sawtooth 52 and a position in which the crescent sawtooth 54 is not in mesh therewith, by a cable 53 which has one end connected to the locking lever 56 and the other end connected to the crescent sawtooth 54.

Here, components of the locking portion 50 are not limited to the present invention, and it is obvious that various changes can be made to the locking portion 50.

Also, the infant-carrying device 1 of the present embodiment further comprises a brake 60 for selectively stopping the rotation of the wheels 16.

As shown in FIG. 9, the brake 60 is structured such that a user operates a brake lever 62 installed adjacent to the handle 14 to selectively stop the rotation of the wheels 16 by the movement of a brake cable 64.

Thus, the user can selectively operate the brake 60 so as to keep the infant-carrying device 1 safe and convenient on, for example, an escalator.

Although a caliper brake is used as the brake 60 of the infant-carrying device 1 in the present embodiment, it is obvious that it is possible to use other various brakes, such as a cantilever brake, a V-brake, or a disc brake, instead.

As explained thus far, the multi-functional infant-carrying device of the present invention facilitates the conversion of a carrier mode into a carriage mode and vice versa and is structured such that the angle of a back seat is selectively or freely controlled, thereby providing an infant with greater comfort irrespective of the modes.

Also, this infant-carrying device is structurally simple, facilitates the control of the direction, and requires low fabrication cost.

The back seat can be easily separated from the infant-carrying device to function as a car seat, and an infant can selectively face forward or backward in a carriage mode.

This infant-carrying device can sufficiently function as a carriage with only two wheels. Thus, a user can move the infant-carrying device more safely and conveniently on stairs or an escalator.

Further, the infant-carrying device further comprises a brake that is selectively operated by a user to carry the infant in a safer manner.

While the present invention has been particularly shown and described with reference to preferred embodiments thereof, it will be understood by those of ordinary skill in the art that various changes in form and details may be made therein without departing from the spirit and scope of the present invention as defined by the following claims.

What is claimed is:

1. A multi-functional infant-carrying device which functions as both an infant carrier and a carriage, the device comprising:

a pair of front frame members which are arranged to slant forward and include a sling;

a back seat for seating an infant; and support portions which extend backward from the front frame members to support the back seat so as to enable the control of the angle of the back seat, wherein a handle is mounted at top ends of the front frame members, and wheels are mounted at bottom ends of the front frame members to contact the ground.

2. The device of claim 1, wherein the wheels are two wheels which are installed at the bottom ends of the front frame members, respectively, and wherein a stopper is mounted at bottom portions of the front frame members to stop or park the infant-carrying device in a carriage mode.

3. The device of claim 1, further comprising a shock absorber for absorbing a shock transmitted from the wheels.

4. The device of claim 2, further comprising a shock absorber for absorbing a shock transmitted from the wheels.

5. The device of claim 1, wherein the back seat is attachable to and detachable from the support portions to function as a car seat.

6. The device of claim 1, further comprising a locking portion for selectively locking the rotation of the back seat by the operation of a locking level installed adjacent to the handle.

7. The device of claim 1, further comprising a brake for selectively stopping the rotation of the wheels by the operation of a brake lever installed adjacent to the handle.

* * * * *